United States Patent
Hama (10) Patent No.: US 9,650,142 B2
(45) Date of Patent: May 16, 2017

(54) MONITOR DEVICE DRIVEN TO MOVE IN RESPONSE TO DETECTION BY SWITCH

(71) Applicant: Panasonic Intellectual Property Management Co., Ltd., Osaka (JP)

(72) Inventor: Kota Hama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/043,698

(22) Filed: Feb. 15, 2016

(65) Prior Publication Data
US 2016/0249470 A1    Aug. 25, 2016

(30) Foreign Application Priority Data

Feb. 24, 2015 (JP) ................. 2015-033536
Feb. 1, 2016 (JP) ................. 2016-016821

(51) Int. Cl.
*H05K 7/16* (2006.01)
*B64D 11/00* (2006.01)

(52) U.S. Cl.
CPC ................. *B64D 11/0015* (2013.01)

(58) Field of Classification Search
CPC ..... B60R 2011/0082; B60R 2011/0085; B60R 2011/0092; B60R 11/0264; B60R 7/04; B64D 11/0015; B64D 11/00153; H01H 21/24; H01H 2221/044; H01H 3/161; H05K 5/0017; H05K 1/18; H05K 5/0204; H05K 5/0226; H05K 5/0247; H05K 7/12; E05Y 2400/854; E05Y 2400/86

USPC ................ 361/632, 726, 755, 769, 781, 837
See application file for complete search history.

(56) References Cited

U.S. PATENT DOCUMENTS 5,062,342 A * 11/1991 Nagatsuma ............ G10H 1/346
                                                                84/439
2002/0006741 A1    1/2002 Kajio et al.
2002/0126003 A1    9/2002 Horikawa
2012/0193855 A1    8/2012 Takahashi

FOREIGN PATENT DOCUMENTS

| JP | 2000-282315 | 10/2000 |
| JP | 2001-319549 | 11/2001 |
| JP | 2013-237339 | 11/2013 |
| JP | 2014-202809 | 10/2014 |
| WO | 2011/040062 | 4/2011 |

\* cited by examiner

*Primary Examiner* — James Wu
(74) *Attorney, Agent, or Firm* — McDermott Will & Emery LLP (57) ABSTRACT

The monitor device in the disclosure includes a base element furnished with a first face and a second face, a first member, a switch, a second member, and a link member. The first member is disposed on a side of the first face of the base element, enabled to approach toward and separate from the first face. The switch detects whether the first member has approached toward the first face up to a first distance therefrom. The second member is disposed on a side of the second face of the base element, enabled to approach toward and separate from the second face. The link member is connected to the first member such as to cause the first member to approach the first face up to the first distance therefrom, in association with the second member approaching the second face up to a second distance therefrom.

9 Claims, 9 Drawing Sheets

MONITOR DEVICE DRIVEN TO MOVE IN RESPONSE TO DETECTION BY SWITCH

BACKGROUND

1. Technical Field

The disclosure relates to an openable and closable monitor device.

2. Description of the Related Art

Patent Literature 1 discloses a monitor storing device of an openable and closable type. The monitor storing device, which includes a load detector, moves a monitor to a stored position when the load detector detects force pressing a rear panel of the monitor storing device. With this configuration, a monitor is controlled to be stored when a person or an object hits the monitor.

CITATION LIST

Patent Literature

PTL1: Unexamined Japanese Patent Publication No. 2014-202809

SUMMARY

The disclosure proposes a monitor device capable of opening and closing a monitor when the monitor receives impact in a forward and rearward direction.

The monitor device in the disclosure includes a base element furnished with a first face and a second face, a first member, a switch, a second member, and a link member. The first member is disposed on a side of the first face of the base element, enabled to approach toward and separate from the first face. The switch detects whether the first member has approached toward the first face up to a first distance therefrom. The second member is disposed on a side of the second face of the base element, enabled to approach toward and separate from the second face. The link member is connected to the first member such as to cause the first member to approach the first face up to the first distance therefrom, in association with the second member approaching the second face up to a second distance therefrom.

The monitor device in the disclosure can effectively open and close a monitor when the monitor receives impact in a forward and rearward direction.

DETAILED DESCRIPTION OF THE PREFERRED EMBODIMENTS

Hereinafter, exemplary embodiments will be described in detail with reference to the drawings, as necessary. However, the detailed description, if it is more than necessary, will be omitted. For instance, detailed description about well-known matter or overlapped description about the substantially same configuration will be omitted. This is because the following description is prevented from being redundant unnecessarily and easily understood by a person skilled in the art.

Note that, the accompanying drawings and the following description are given in order for a person skilled in the art to fully understand the disclosure, but not intended to limit the subject matter recited in claims.

First Exemplary Embodiment

Figure 1:
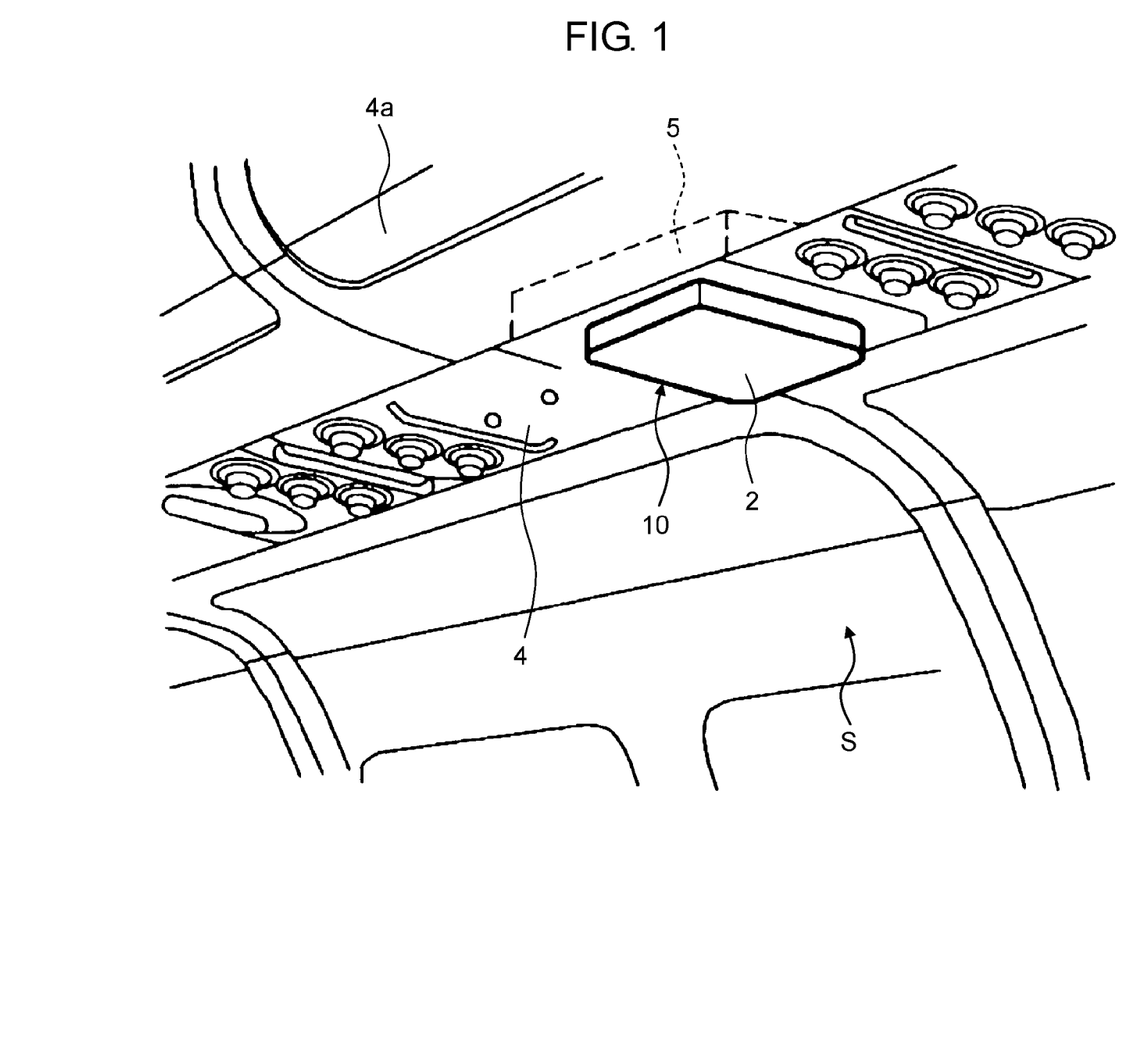
FIG. 1 is a perspective view showing a closed state of a monitor of a monitor device in a first exemplary embodiment.
Figure 2:
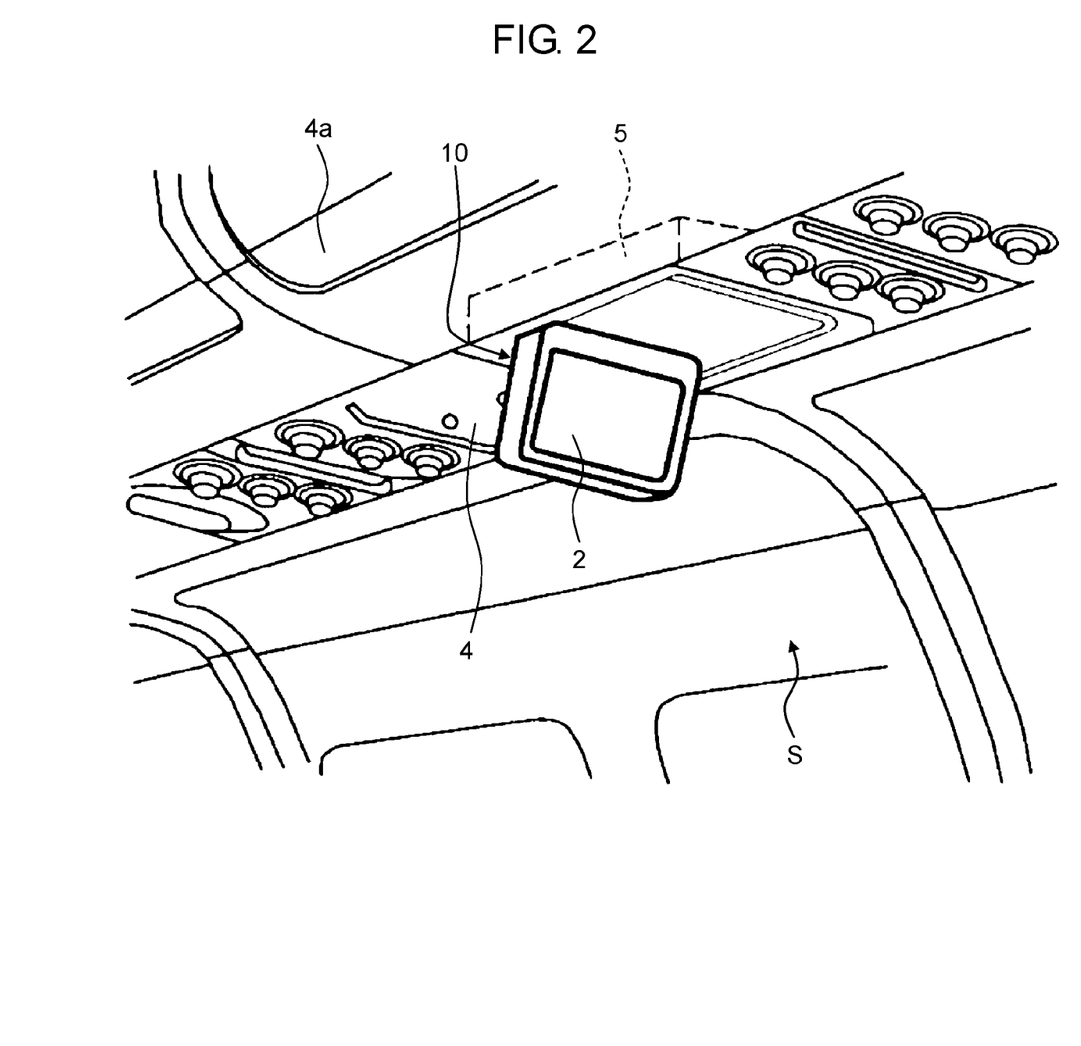
FIG. 2 is a perspective view showing an open state of the monitor of the monitor device in the first exemplary embodiment.

Monitor device 10 in accordance with a first exemplary embodiment of the disclosure will be described using FIGS. 1 to 9. FIG. 1 is a perspective view showing a closed state of monitor 2 in monitor device 10 installed in a ceiling 4 of an aircraft cabin S. FIG. 2 is a perspective view showing an open state of monitor 2 in monitor device 10. Monitor device 10 is disposed in the ceiling 4 of a passenger compartment in the aircraft cabin S, especially below openable and closable overhead compartment 4a installed in ceiling 4. Monitor device 10 includes monitor 2 capable of displaying images, and storing part 5 for storing monitor 2. Monitor 2 is stored in storing part 5 (closed state), and rotates to be exposed from storing part 5 (open state). Monitor 2 can move between the closed state and the open state.

[1-1. Structure Of Monitor 2]

Figure 3:
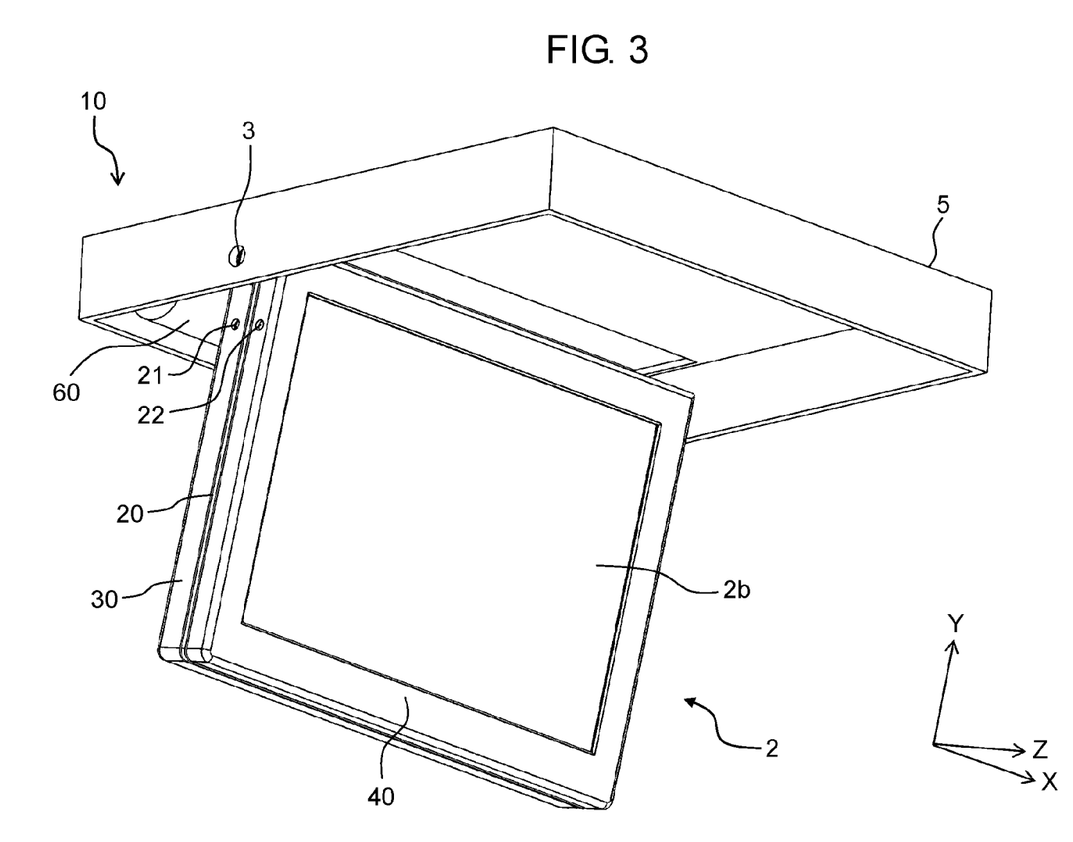
FIG. 3 is an external perspective view of the monitor device in the first exemplary embodiment.
Figure 4:
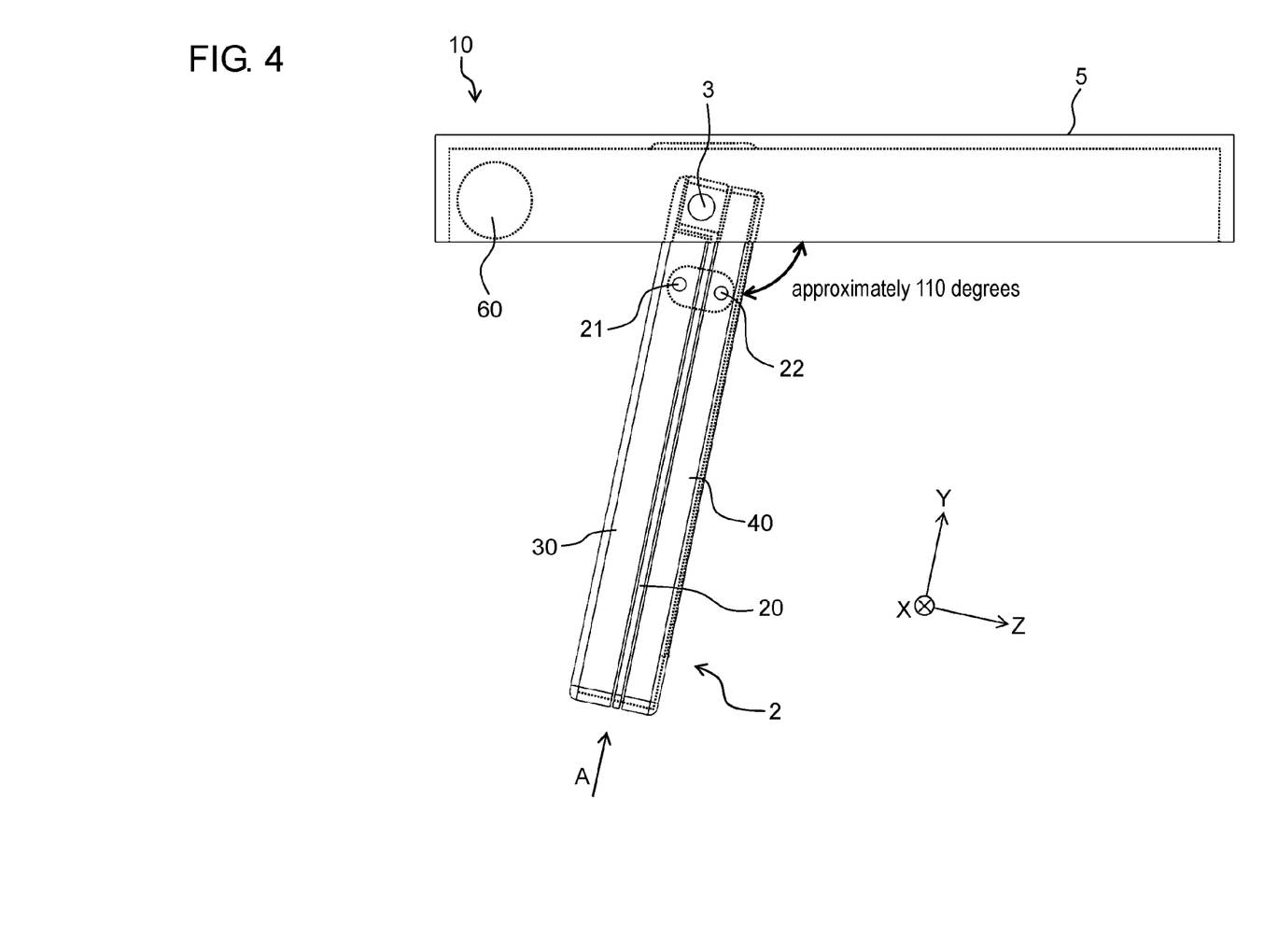
FIG. 4 is a side view of the monitor device in the first exemplary embodiment.

FIG. 3 is an external perspective view of monitor device 10. FIG. 4 is a side view of monitor device 10. Each view shows an open state of monitor 2 in monitor device 10. Monitor device 10, as shown in FIG. 3, includes motor 60 for rotating monitor 2, and rotation shaft 3 serving as a rotational center of monitor 2 with respect to storing part 5. Monitor 2 is pivotally connected to storing part 5 via rotation shaft 3. Further, monitor 2 includes chassis 20, back cover 30, front cover 40, and liquid crystal panel 2b. For convenience of description, X-axis is defined by a direction along a longitudinal direction of monitor 2, Y-axis is defined by a direction along a transverse direction of monitor 2, and Z-axis is defined by a direction along a normal direction with respect to a front and back faces of monitor 2. Monitor 2 has, as shown in FIG. 3, a rectangular shape whose length in a width direction (longitudinal direction) is longer than that in a length direction (transverse direction) in an open state, but not limited to this.

Chassis 20 is a body of monitor 2. In chassis 20, a face on a front side of monitor 2 is defined as "front face," and a face on a back side of monitor 2 is defined as "back face." Note that, in the following description, for each member, a face facing the front face of monitor 2 is referred to as "front face," and a face facing the back face of monitor 2 is referred to as "back face."

Back cover 30 is an exterior part disposed on the back side of monitor 2 (i.e., the back face side of chassis 20). Back cover 30 is held to chassis 20 by attaching shaft 21 provided in parallel to X-axis. Attaching shaft 21 is disposed on an upper back face side of chassis 20 and holds both sides of back cover 30. Back cover 30 can rotate within a small range about attaching shaft 21. This means that a tip end portion of back cover 30 can move slightly in approximately Z-axis direction with respect to chassis 20 when back cover 30 pivots slightly about attaching shaft 21.

Front cover 40 is an exterior part disposed on the front side of monitor 2 (i.e., the front face side of chassis 20). Front cover 40 has an opening in its center. Front cover 40 is held to chassis 20 by attaching shaft 22 provided in parallel to X-axis. Attaching shaft 22 is disposed on an upper front face side of chassis 20 and holds both sides of front cover 40. Front cover 40 can rotate within a small range about attaching shaft 22. This means that a tip end portion of front cover 40 can move slightly in approximately Z-axis direction with respect to chassis 20 when front cover 40 pivots slightly about attaching shaft 22.

Liquid crystal panel 2b is fixed to chassis 20. Liquid crystal panel 2b is exposed to the outside from the opening of front cover 40. Liquid crystal panel 2b can display images based on a video signal that is inputted from the outside.

Monitor 2 can move rotationally from a stored state (closed state) to a developed sate (open state) about rotation shaft 3 parallel to X-axis. Herein, the stored state is such a state that monitor 2 is parallel to storing part 5, and the developed state is such a state that monitor 2 is tilted approximately 110 degrees with respect to storing part 5. Monitor 2 is driven by motor 60.

Figure 5:
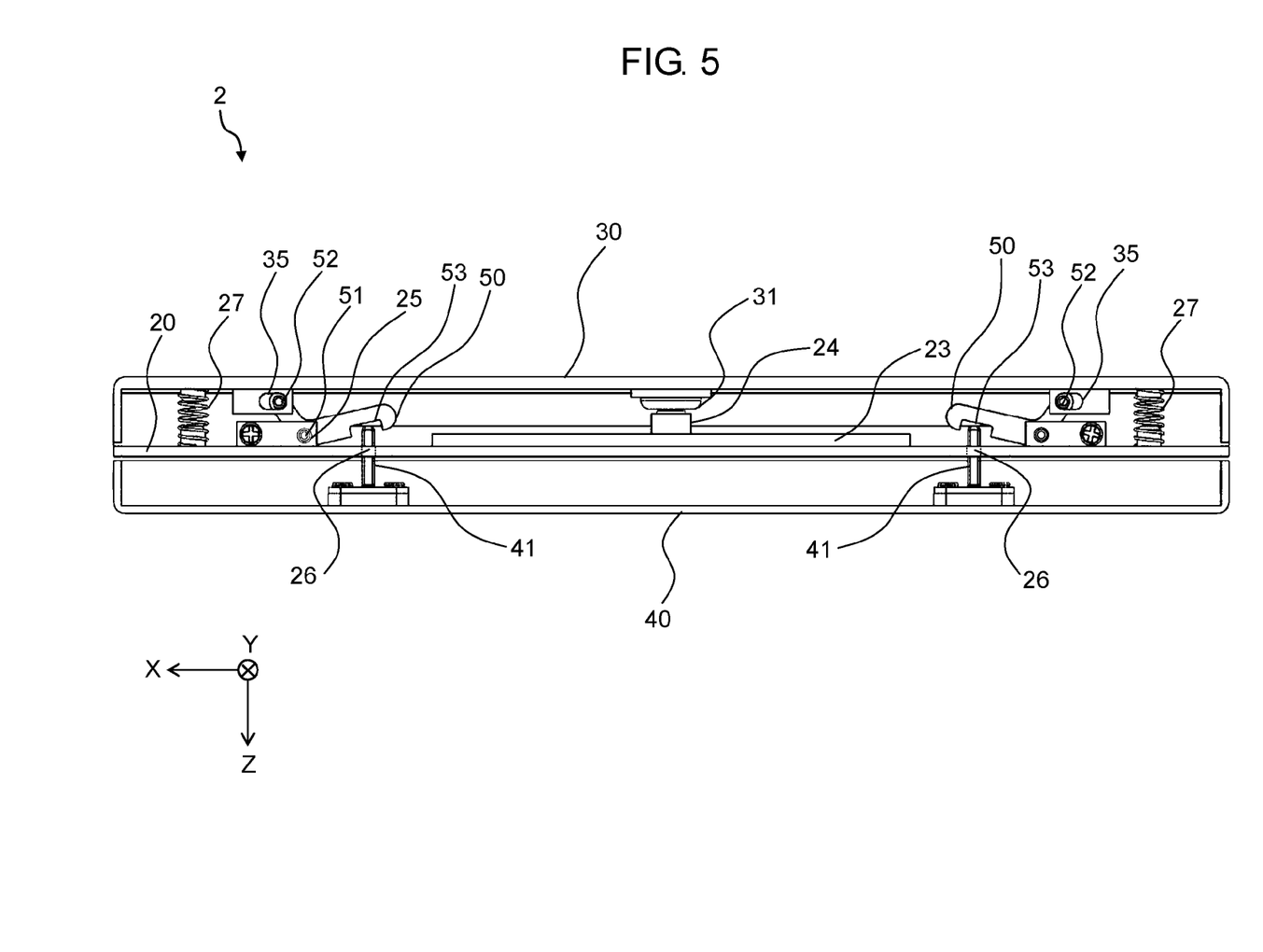
FIG. 5 is a view showing an internal structure of the monitor in the first exemplary embodiment.
Figure 6:
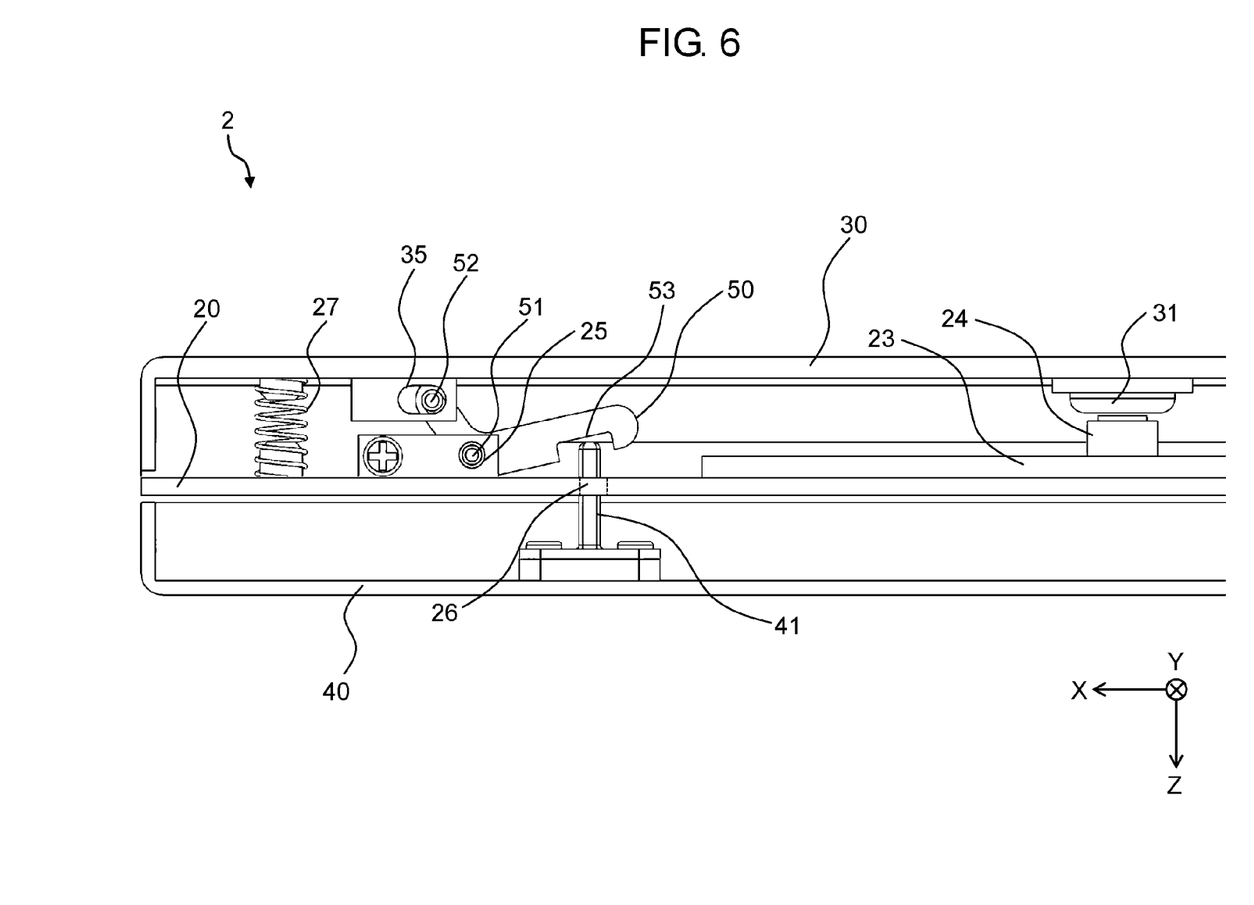
FIG. 6 is an enlarged view showing the internal structure of the monitor in the first exemplary embodiment.

FIG. 5 is a view showing an inner structure of the tip end portion of monitor 2 when viewed from an arrow A direction shown in FIG. 4. Further, FIG. 6 is a partially elongated view of FIG. 5. Herein, the tip end portion of monitor 2 indicates an end portion positioned on a side of monitor 2 far from rotation shaft 3 in the transverse direction (Y-axial direction). The monitor device 10 of the present embodiment has mechanisms disposed on both sides in the longitudinal direction (X-axial direction) of monitor 2 at the tip end portion to detect impact symmetrically. In the following, one of the mechanisms will be described, but the other is the same.

Substrate 23, switch 24, bearing 25, spring 27, shaft 51, and lever 50 are provided on chassis 20. Substrate 23 is fixed to the back face (the face on a back cover 30 side) of chassis 20. Switch 24 is fixed on a back face (a face on a back cover 30 side) of substrate 23. Bearing 25 is fixed to the back face (the face on the back cover 30 side) of chassis 20. Bearing 25 holds shaft 51 rotatably about Y-axis. Shaft 51 is fixed to lever 50, and bearing 25 holds lever 50 via shaft 51.

Lever 50 has an L-shape as shown in FIG. 6 and is supported by shaft 51 provided at a part (corner portion) of lever 50. Lever 50 is a lever-shaped member capable of rotating within a predetermined range about shaft 51 as a fulcrum. Lever 50 has shaft 52, which is parallel to Y-axial direction, on a first end side of lever 50. Lever 50 has face 53 on a second end side of lever 50, which is the opposite side of lever 50 to shaft 52. The both ends of lever 50 are elongated from the fulcrum (corner portion) toward a back cover 30 side (a direction separating from chassis 20) and bended to form an L-shape. Thus, lever 50 is supported by bearing 25 via shaft 51 such that both the first and second ends of lever 50 are positioned on the back face side (back cover 30 side) from the fulcrum, for rocking centered on shaft 51 as a fulcrum.

The first end of lever 50 is positioned on an end portion side of monitor 2 in X-direction, and the second end of lever 50 is positioned on a center portion side of monitor 2 in X-direction. Face 53 is provided on the front face side (front cover 40 side) of lever 50. Face 53 is, as shown in FIG. 6, a bottom face of a U-shaped cutout portion formed in lever 50, but the cutout portion is not necessary to be formed in lever 50. Face 53 enables to abut on pin 41 (described later).

Spring 27 holds between chassis 20 and back cover 30. Spring 27 biases back cover 30 in a direction separating from chassis 20. If no external force such as impact is applied on monitor 2, spring 27 keeps a distance between chassis 20 and back cover 30 and a distance between chassis 20 and front cover 40 at a predetermined distance. When back cover 30 rotates about attaching shaft 21, spring 27 is expanded and constructed within a small range in Z-axial direction. Spring 27 is, as shown in FIG. 6, provided between lever 50 and an edge portion of monitor 2 in X-axial direction.

Back cover 30 includes protrusion 31 and bearing 35. Protrusion 31 is positioned in proximity to the center portion in X-axial direction of monitor 2 at the tip end portion. Protrusion 31 is fixed to an inner face side (front face side) of back cover 30 and faces switch 24 provided on substrate 23. Bearing 35 is fixed to the inner face side of back cover 30. Bearing 35 is a long hole expanding along X-axis and holds shaft 52 of lever 50. At this time, when lever 50 pivotally moves to back cover 30 about shaft 51 with respect to chassis 20, shaft 52 rotates within a small range in X-axial direction while moving along the long hole of bearing 35. Thus, bearing 35 holds the first end of lever 50 via shaft 52. When back cover 30 rotates slightly about attaching shaft 21, the tip end portion of back cover 30 moves in substantially Z-axial direction. This allows back cover 30 to approach toward and separate from the back face of chassis 20.

Front cover 40 includes pin 41 protruding toward back cover 30 on its inner face side (back face side). Pin 41 is a protrusion fixed to front cover 40. Pin 41, penetrating hole 26 provided in chassis 20, protrudes toward a back cover 30 side and enables to abut on face 53 of lever 50. When front cover 40 slightly rotates about attaching shaft 22, the tip end portion of front cover 40 is moved in substantially Z-axial direction. This allows front cover 40 to approach toward and separate from the front face of chassis 20. When front cover 40 moves, pin 41 is moved together with front cover 40 in substantially Z-axial direction.

Figure 7:
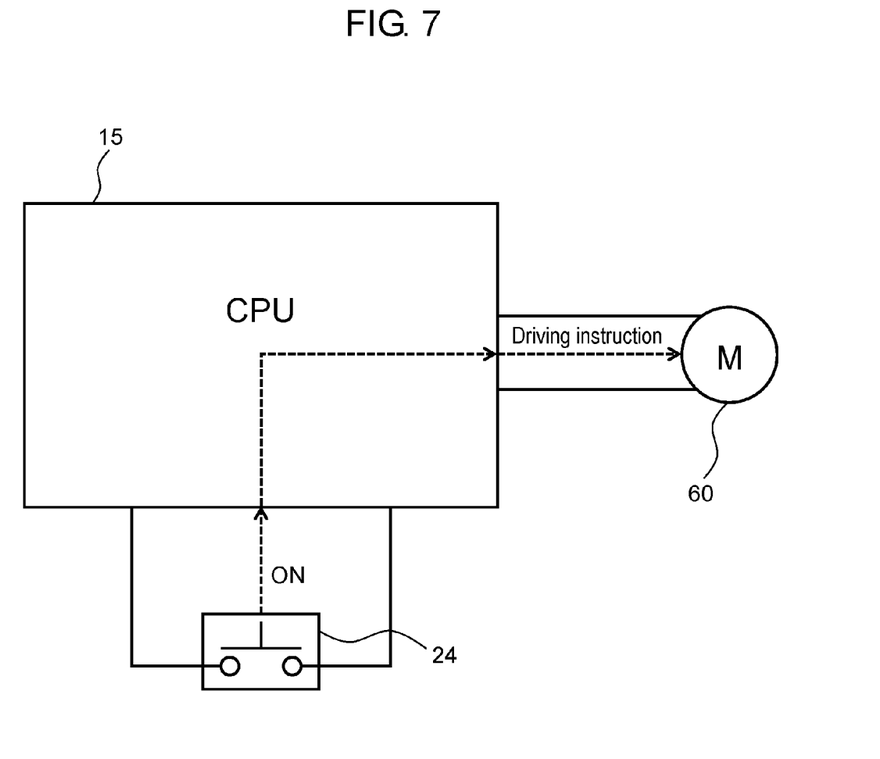
FIG. 7 is a block diagram showing an electrical configuration associated with impact detection of the monitor device in the first exemplary embodiment.

FIG. 7 is a block diagram showing an electrical configuration associated with impact detection of monitor device 10. Monitor device 10 includes CPU 15, switch 24, and motor 60. As shown in FIG. 7, switch 24 and motor 60 are connected to CPU 15. When a person or an object hits monitor device 10 and back cover 30 or front cover 40 is pressed into, switch 24 is turned on (ON state) and then CPU 15 detects the ON state. When CPU 15 has detected the ON state of switch 24, motor 60 is controlled to be driven through motor driving instruction.

Chassis 20 is an example of the base element. The back face of chassis 20 is an example of the first face. The front face of chassis 20 is an example of the second face. Back cover 30 is an example of the first member. Front cover 40 is an example of the second member. Lever 50 is an example of the link member.

[1-2. Operation Of Monitor 2]

Monitor device 10 of the present embodiment moves a monitor to the stored state or the developed state, when back cover 30 or front cover 40 of monitor 2 receives an external force. Hereinafter, the above operation will be described.

[1-2-1. Operation of Monitor 2 When Being Developed]

Figure 8:
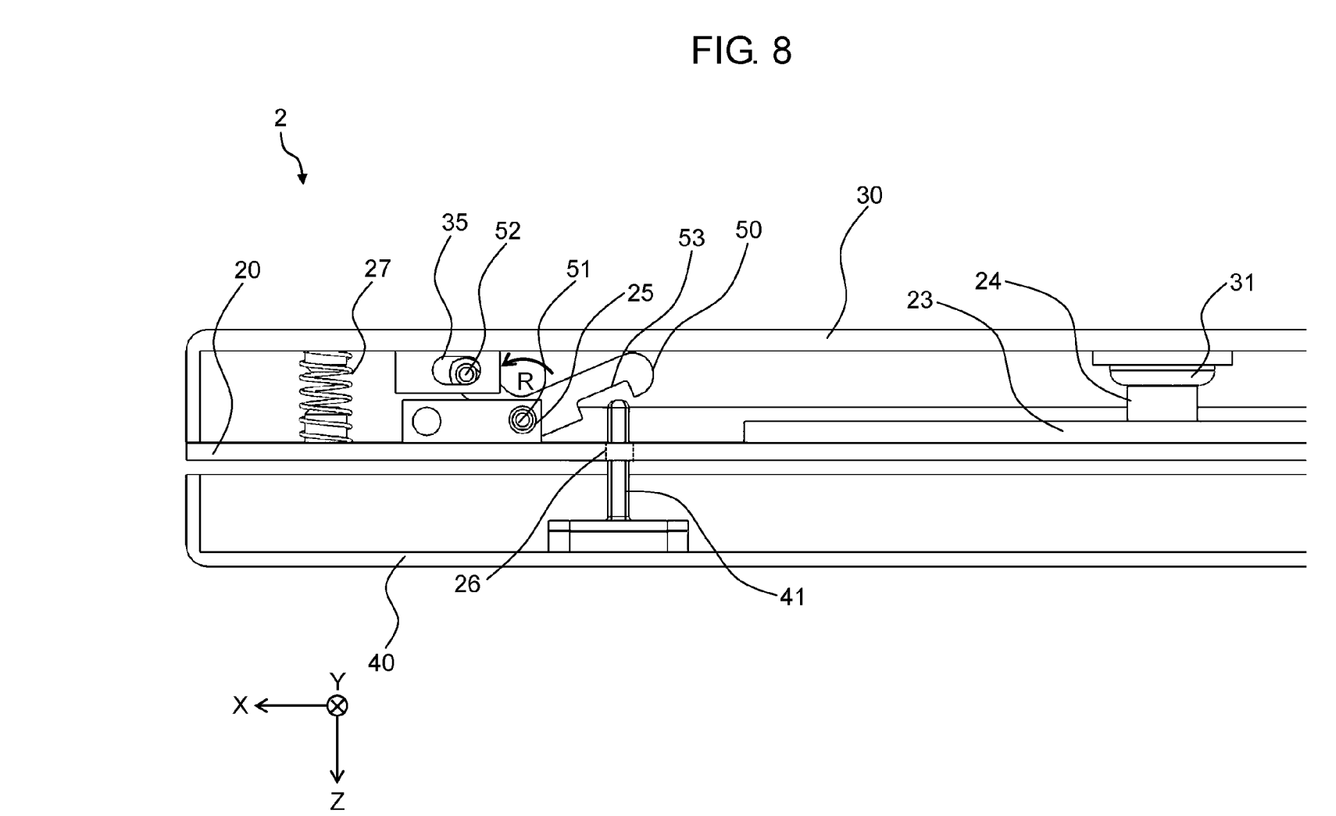
FIG. 8 is a view for explain operation of the monitor in the first exemplary embodiment when an external force is applied on a back cover while the monitor is opening.

FIG. 8 is a view explaining operation of monitor device 10 when an external force is applied on back cover 30 while monitor 2 is being developed from the closed state to the open state. It is supposed that a predetermined external force is applied on back cover 30 while monitor 2 is being turned from the closed state to the open state by driving motor 60 through CPU 15. At this time, back cover 30 slightly rotates about attaching shaft 21 and the tip end portion of monitor 2 approaches chassis 20. When back cover 30 approaches chassis 20 to decrease the distance between back cover 30 and the back face of chassis 20 to a first distance, protrusion 31 of back cover 30 presses switch 24 positioned on substrate 23. CPU 15 detects the operation by switch 24 is pressed. Motor 60 is instructed through CPU 15 to turn reversely, so that monitor 2 is rotated from the open state to the closed state. Thus, monitor 2 is returned to the closed state.

Further, when an external force is applied on the back cover 30 side of monitor 2 and back cover 30 approaches chassis 20, shaft 52 of lever 50 is forced to approach chassis 20 via bearing 35 of back cover 30. Then, lever 50 slightly rotates about shaft 51 in an arrow R direction shown in FIG. 8.

When the predetermined external force applied on the back cover 30 is eliminated, back cover 30 that has approached chassis 20 is returned back to the initial position by restoring force of spring 27, so that switch 24 is turned off. Via bearing 35 of back cover 30, shaft 52 of lever 50 is forced to separate from chassis 20, so that lever 50 is slightly rotated in a direction reverse to the arrow R direction shown in FIG. 8.

Note that, if the external force applied on back cover 30 does not exceed a predetermined value, the distance between back cover 30 and the back face of chassis 20 is not decreased to the first distance, so that protrusion 31 fails to press switch 24 positioned on substrate 23.

[1-2-2. Operation of Monitor 2 When Being Stored]

Figure 9:
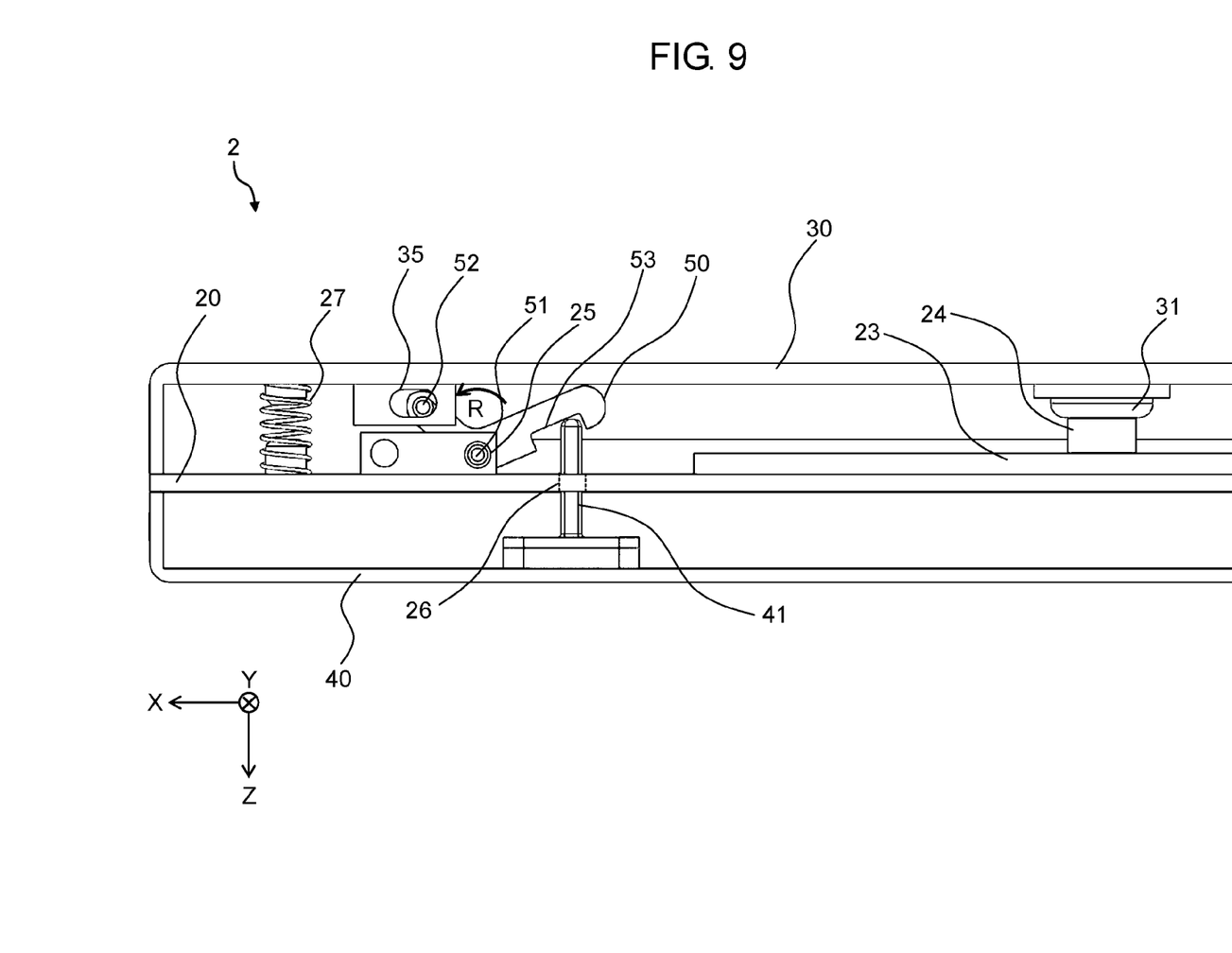
FIG. 9 is a view for explaining operation of the monitor in the first exemplary embodiment when an external force is applied on a front cover while the monitor is closing.

FIG. 9 is a view explaining operation of monitor device 10 when an external force is applied on front cover 40 while monitor 2 is being stored, i.e., moving from the open state to the close state. It is supposed that a predetermined external force is applied on the front cover 40 side of monitor 2 while monitor 2 is being turned from the open state to closed state by driving motor 60 through CPU 15. At this time, front cover 40 slightly rotates about attaching shaft 22 and the tip end portion of monitor 2 approaches chassis 20. When front cover 40 moves toward chassis 20, pin 41 is moved together with front cover 40, so that face 53 of lever 50 is pressed. When face 53 is pressed to approach back cover 30, lever 50 slightly rotates about shaft 51 in an arrow R direction shown in FIG. 9. When lever 50 rotates, shaft 52 is moved along the long hole of bearing 35, so that back cover 30 is moved toward chassis 20.

At this time, as front cover 40 approaches the front face of chassis 20 and a distance between front cover 40 and the front face of chassis 20 is decreased to a second distance, back cover 30 approaches chassis 20 and the distance between back cover 30 and the back face of chassis 20 is decreased to the first distance. Thus, protrusion 31 of back cover 30 presses switch 24 positioned on substrate 23. When switch 24 is pressed, CPU 15 detects the operation. Motor 60 is instructed through CPU 15 to turn reversely, so that motor 60 rotates in a direction in which monitor 2 is rotated from the closed state to the open state. Thus, monitor 2 returns back to the open state. When the predetermined external force applied on the front cover 40 is eliminated, front cover 40 and back cover 30 are returned back to the initial position by restoring force of spring 27, so that switch 24 is turned off.

Note that, in the case where the external force applied on front cover 40 does not exceed a predetermined value, even if pin 41 presses face 53 of lever 50 to rotate lever 50 in the arrow R direction, the distance between back cover 30 and the back face of chassis 20 is not decreased to the first distance, so that protrusion 31 fails to press switch 24 positioned on substrate 23.

Further, in the case where an external force is applied to liquid crystal panel 2b rather than front cover 40 while monitor 2 is being stored by monitor device 10, i.e., moving from the open state to the closed state, chassis 20 to which liquid crystal panel 2b is fixed approaches back cover 30. When the distance between back cover 30 and the back face of chassis 20 is decreased to the first distance, protrusion 31 presses switch 24 positioned on substrate 23. When switch 24 is turned on, CPU 15 detects the operation. After that, motor 60 is instructed through CPU 15 to turn reversely, so that motor 60 rotates in a direction in which monitor 2 is rotated from the closed state to the open state. Thus, monitor 2 returns back to the open state. When the predetermined external force applied to liquid crystal panel 2b is eliminated, the distance between liquid crystal panel 2b and back cover 30 is returned back to the initial state by the restoring force of spring 27, so that switch 24 is turned off.

[1-3. Effect]

As above, in the present embodiment, monitor device 10 includes chassis 20 having a front face and a back face, back cover 30, switch 24, front cover 40, and lever 50. Back cover 30 is disposed on the back face side of chassis 20 to approach toward and separate from the back face of chassis 20. Switch 24 detects whether or not back cover 30 approaches the back face of chassis 20 up to a first distance. Front cover 40 is disposed on a front face side of chassis 20 to approach toward and separate from the front side of chassis 20. Lever 50 is connected to back cover 30 to cause back cover 30 to approach the back face of chassis 20 up to the first distance as front cover 40 approaches the front face of chassis 20 up to a second distance.

Accordingly, when a passenger's head, for example, hits back cover 30 of monitor 2 while monitor 2 is being developed, the impact can be detected as a predetermined external force and monitor 2 is controlled to move to the closed state. Similarly, when monitor 2, for example, sandwiches a passenger's finger on its front cover 40 while being stored, the impact can be detected as a predetermined external force and monitor 2 is controlled to move to the open state. Even if an external force is applied on either of back cover 30 or front cover 40, monitor device 10 of the present embodiment can detect the impact by using switch 24 positioned on substrate 23 of chassis 20 and drive motor 60 controllably. That is, monitor device 10 of the present embodiment can effectively open and close monitor 2 when received impact in a forward and rearward direction of monitor 2.

(Another Exemplary Embodiment)

As above, the first exemplary embodiment has been described as exemplary technology disclosed in the present application. However, the technology described in the disclosure is not limited to this. It may be applied to modified, replaced, added, and omitted embodiments. Further, each of the elements described in the above first exemplary embodiment may be combined to provide a new embodiment. Hereinafter, another embodiment will be described.

As an inner structure of the tip end portion of monitor 2, the first exemplary embodiment includes switch 24, lever 50, and others on the back face side of chassis 20, and includes pin 41 on the front cover 40 side thereof. For the inner structure of the tip end portion of monitor 2, the front face side (front cover 40 side) and the back face side may be inversed. In this case, to provide liquid crystal panel 2b, the front face side of chassis 20 needs a space. Accordingly, lever 50 and other components are desirably disposed on the back face side as describe in the first exemplary embodiment, thereby compacting monitor 2 more.

The first exemplary embodiment describes such a configuration that both ends of lever 50 are bended at a fulcrum while extending toward the back face side, and a first and second ends of lever 50 are positioned on a back face side from the fulcrum. To protrude the second end of lever 50 to the front cover 40 side (the front face side of chassis 20), however, an opening may be formed in chassis 20 on the second end side of lever 50. In this case, pin 41 is not necessary to protrude toward the back face side of chassis 20 but the opening is necessary to be large enough for lever 50 to protrude from the front face side of chassis 20. Therefore, the configuration of the first exemplary embodiment is more simplified than that of the above modification.

The first exemplary embodiment such a configuration that liquid crystal panel 2b is employed as a display panel. However, the display panel is not limited to a liquid crystal panel. It may be organic electro-luminescence or the like. Further, a touch panel may be employed as the display panel.

The first exemplary embodiment describes such a configuration that back cover 30 is supported to rotate about attaching shaft 21 and thereby the tip end portion of back cover 30 of monitor 2 enables to approach toward and separate from chassis 20. However, a manner of attaching back cover 30 to chassis 20 is not limited to this. Back cover 30 may be supported to move in a direction parallel to chassis 20 such that back cover 30 enables to approach toward and separate from chassis 20. Front cover 40 is similar to back cover 30.

The first exemplary embodiment describes such a configuration that a mechanism for detecting impact from a person or an object is disposed in the tip end portion of monitor 2. However, the mechanism for detecting the impact may be disposed in a position other than the tip end portion.

The first exemplary embodiment describes such a configuration that pin 41 and face 53 of lever 50 abut on at the second end of lever 50. However, pin 41 and the second end of lever 50 may be connected such that lever 50 can rotate. In this case, spring 27, which is disposed between chassis 20 and back cover 30, may be disposed between chassis 20 and front cover 40. The first exemplary embodiment describes such a configuration that pin 41 is fixed to front cover 40, but pin 41 may be formed integrally with front cover 40. Further, pin 41 may be connected to the second end of lever 50, without being fixed to front cover 40, to abut on an inner face (face of chassis 20 side) of front cover 40.

The first exemplary embodiment describes such a configuration that two mechanisms for detecting the impact are disposed symmetrically on both ends of the tip end portion in the longitudinal direction of monitor 2. The number of mechanisms for detecting the impact included in monitor device 10 may be one, or may be three or more.

In the first exemplary embodiment, the first end of lever 50 is disposed on an edge side of monitor 2 and the second end of lever 50 is disposed on a center side of monitor 2. However, the second end of lever 50 may be disposed on the edge side of monitor 2 and the first end of lever 50 may be disposed on the center side of monitor 2.

The first exemplary embodiment describes such a configuration that spring 27 is disposed between chassis 20 and back cover 30. However, elastic members such as a cushion material and rubber may be used instead of spring 27. Further, pin 41 may be formed of elastic members such as a spring and rubber without using spring 27. In this case, pin 41, which is formed of the elastic members, is rotatably connected to the second end of lever 50.

INDUSTRIAL APPLICABILITY

The disclosure can be applied to a monitor device capable of opening or closing a monitor when receiving impact in a forward and rearward direction of the monitor. Specifically, the disclosure can be applied to a monitor device installed in an aircraft, a train, a bus, or the like.

What is claimed is:

1. A monitor device comprising:
   a base element furnished with a first face and a second face;
   a first member disposed on a side of the first face of the base element, enabled to approach toward and separate from the first face;
   a switch for detecting whether the first member has approached toward the first face up to a first distance therefrom;
   a second member disposed on a side of the second face of the base element, enabled to approach toward and separate from the second face; and
   a link member connected to the first member such as to cause the first member to approach the first face up to the first distance therefrom, in association with the second member approaching the second face up to a second distance therefrom,
   wherein the monitor device is driven to move by a driving device in response to the switch detecting that the first member has approached toward the first face up to the first distance therefrom.

2. The monitor device according to claim 1, wherein:
   the second member comprises a pin disposed on the side of the second face, either enabled to abut on, or connected to, the link member; and
   the link member is furnished with a first end connected to the first member, a second end either enabled to abut on, or connected to, the pin, and a fulcrum positioned between the first end and the second end and connected to the base element for rocking the link member about the fulcrum.

3. The monitor device according to claim 2, wherein:
   the pin penetrates the base element, protruding toward the side of the first face thereof; and
   the link member is disposed on the side of the first face of the base element.

4. The monitor device according to claim 1, further comprising:
   an elastic member configured to separate the first member from the base element.

5. The monitor device according to claim 1, wherein
   the link member is furnished with a first end connected to the first member, a second end connected to a pin, and a fulcrum positioned between the first end and the second end and connected to the base element for rocking the link member about the fulcrum, and
   wherein the pin is enabled to abut on the second member.

6. The monitor device according to claim 1, wherein the driving device includes a motor.

7. The monitor device according to claim 1, wherein the base element includes a display panel disposed thereon.

8. The monitor device according to claim 1, wherein the link member is disposed between the first member and the second member.

9. The monitor device according to claim 2, wherein the first end of the link member is disposed between the first member and the second member.

* * * * *